(12) United States Patent
Cao et al.

(10) Patent No.: US 8,439,170 B2
(45) Date of Patent: May 14, 2013

(54) SELF-REINFORCING ELECTROMECHANICAL DISC BRAKE

(75) Inventors: Chi-Thuan Cao, Korntal-Muenchingen (DE); Dietmar Baumann, Hemmingen (DE); Dirk Hofmann, Stuttgart (DE); Herbert Vollert, Vaihingen/Enz (DE); Willi Nagel, Remseck/Hochdorf (DE); Andreas Henke, Diemelstadt (DE); Bertram Foitzik, Ilsfeld (DE); Bernd Goetzelmann, Sindelfingen (DE); Hans Frick, Wiggensbach (DE)

(73) Assignee: Robert Bosch GmbH, Stuttgart (DE)

( * ) Notice: Subject to any disclaimer, the term of this patent is extended or adjusted under 35 U.S.C. 154(b) by 1011 days.

(21) Appl. No.: 11/997,241

(22) PCT Filed: Jun. 14, 2006

(86) PCT No.: PCT/EP2006/063200
§ 371 (c)(1),
(2), (4) Date: Jan. 29, 2008

(87) PCT Pub. No.: WO2007/012523
PCT Pub. Date: Feb. 1, 2007

(65) Prior Publication Data
US 2008/0217120 A1   Sep. 11, 2008

(30) Foreign Application Priority Data

Jul. 29, 2005   (DE) .......................... 10 2005 035 608

(51) Int. Cl.
*F16D 55/46*   (2006.01)

(52) U.S. Cl.
USPC ........................................ 188/72.2; 188/72.7

(58) Field of Classification Search ................. 188/71.1, 188/72.1, 72.2, 72.7, 73.43, 73.47, 156, 158, 188/162
See application file for complete search history.

(56) References Cited

U.S. PATENT DOCUMENTS

| | | | |
|---|---|---|---|
| 3,949,839 A * | 4/1976 | Girauldon | 188/73.31 |
| 5,290,070 A * | 3/1994 | Deits et al. | 384/625 |
| 6,173,819 B1 * | 1/2001 | Meiss et al. | 188/73.31 |
| 7,484,601 B2 * | 2/2009 | Baumann et al. | 188/72.2 |
| 2004/0134723 A1 * | 7/2004 | Baumann et al. | 188/72.2 |
| 2004/0154881 A1 * | 8/2004 | Baumann et al. | 188/72.2 |
| 2004/0245056 A1 | 12/2004 | Baumann et al. | |
| 2004/0262098 A1 | 12/2004 | Baumann et al. | |
| 2005/0121267 A1 * | 6/2005 | Baumann et al. | 188/156 |
| 2006/0201756 A1 * | 9/2006 | Severinsson | 188/72.2 |

FOREIGN PATENT DOCUMENTS

| | | |
|---|---|---|
| DE | 42 36 683 A1 | 5/1994 |
| DE | 102 26 035 A1 | 12/2003 |
| JP | 9053670 A | 2/1997 |
| JP | 200074111 A | 3/2000 |
| JP | 2001523796 A | 11/2001 |
| JP | 2002532672 A | 10/2002 |
| JP | 2004513310 A | 4/2004 |

(Continued)

*Primary Examiner* — Anna Momper
(74) *Attorney, Agent, or Firm* — Maginot, Moore & Beck

(57) ABSTRACT

The invention relates to a self-reinforcing electromechanical disc brake having a brake caliper produced by means of shaping, in one piece with a housing for electromechanical parts of an actuating device of the disc brake, with the housing forming a dimensionally stable hollow body. It is possible in this way to produce a bending-resistant and torsionally rigid brake caliper with a low wall thickness.

15 Claims, 2 Drawing Sheets

FOREIGN PATENT DOCUMENTS

| | | |
|---|---|---|
| JP | 2004514098 A | 5/2004 |
| JP | 2004360711 A | 12/2004 |
| JP | 2005121227 A | 5/2005 |
| JP | 2005121228 A | 5/2005 |
| JP | 2006514245 A | 4/2006 |
| JP | 2006514248 A | 4/2006 |
| JP | 2007518942 A | 7/2007 |
| SE | 526098 B2 * | 3/2005 |
| WO | WO 2005/015046 A1 | 2/2005 |

* cited by examiner

SELF-REINFORCING ELECTROMECHANICAL DISC BRAKE

CROSS-REFERENCE TO RELATED APPLICATION

This application is a 35 USC 371 application of PCT/EP 2006/063200filed on Jun. 14, 2006.

BACKGROUND OF THE INVENTION

1. Field of the Invention

The invention relates to an improved self-amplifying electromechanical disc brake.

2. Description of the Prior Art

Electromechanical disc brakes are intrinsically known. They are equipped with an electromechanical actuating device that is able to press a friction brake pad against the brake disc in order to actuate the disc brake, i.e. in order to apply the brakes. Usually, the electromechanical actuating device has an electric motor, which, by means of a rotation/translation converting transmission, for example a screw drive, is able to press the friction brake pad against the brake disc. In numerous cases, a reduction gear train is connected between the electric motor and the rotation/translation converting transmission. There are also other possibilities for embodying a rotation/translation converting transmissions; for example, the electric motor, preferably via a reduction gear train, can pivot a cam that presses the friction brake pad against the brake disc or a rack-and-pinion gear can be used in which a gear moves a rack, which moves the friction brake pad. The rack does not necessarily have to be straight.

In order achieve a self-amplification, there are known ramp mechanisms that have one ramp or a set of ramps, which are inclined in relation to the brake disc, i.e. a distance between the ramp(s) and the brake disc decreases in a tangential or circumferential direction of the brake disc. For example, the ramps can be curved in a helical fashion. The slope of the ramp(s) can change over the course of the ramp(s) so that the power of the self-amplification changes during actuation of the disc brake. It is thus possible for the ramp(s) to have a steep slope at the beginning in order to quickly overcome a clearance between the friction brake pad in the brake disc at the beginning of the actuation and for the end(s) of the ramp(s) to have a gradual slope in order to achieve a powerful self-amplification when the actuation force and braking force are high. If the entire length of the ramp(s) has a constant slope, then these are also referred to as a wedge or wedges and as a wedge mechanism. The ramp(s) can be situated on the brake caliper and/or on the friction brake pad, preferably on its rear side oriented away from the brake disc.

The friction brake pad is supported via the ramp(s) against a brake caliper of the disc brake. In order to actuate the disc brake, the electromechanical actuating device slides the friction brake pad along the ramp(s) until the pad rests against the brake disc and presses against the brake disc. The rotating brake disc exerts a friction force on the friction brake pad, acting on it in the direction toward the rising ramp(s). In accordance with the wedge principal, the support of the friction brake pad on the ramp(s) exerts a normal force in relation to the ramps on the friction brake pad, thus exerting a normal force component in relation to the brake disk on the friction brake pad, and presses the friction brake pad against the brake disc in addition to a compressive force exerted by the actuating device. This amplifies the compressive force and braking force of the disc brake.

The known disc brakes have a brake caliper on which or in which the electromechanical parts of the disc brake are accommodated; the expression "electromechanical parts" is understood to include the components of both the actuating device and the self-amplifying device.

The brake caliper of electromechanical disc brakes is usually, but not absolutely, embodied in the form of a floating caliper, i.e. it is able to move in the direction transverse to the brake disc. When the one friction brake pad is pressed against the one side of the brake disc, the brake caliper shifts transversely to the brake disc and presses another friction brake pad against the other side of the brake disc so that only one actuating device and one self-amplifying device are required in order to press both of the friction brake pads into contact. The actuating device and the self-amplifying device do not have to be situated on the same side of the brake disc.

SUMMARY AND ADVANTAGES OF THE INVENTION

The self-amplifying electromechanical disc brake according to the invention has a brake caliper and a housing that accommodates the electromechanical parts of the disc brake. The housing is part of the brake caliper, in particular the housing is integrally joined to the brake caliper or, in a multipart brake caliper, is integrally joined to a part of the brake caliper. The housing of the disc brake according to the invention is a dimensionally stable hollow body that reinforces the brake caliper against bending and/or torsion. The invention is consequently based on the idea of embodying the brake caliper simultaneously also as a housing for the electromechanical parts of the disc brake, as a result of which the brake caliper has a three-dimensional form and thus, even with a low wall thickness, is stable due to its design, in particular is flexurally rigid and torsionally rigid. The dimensionally stable embodiment of the brake caliper and housing is comparable to a unit construction vehicle body, which, although it is manufactured of thin metal sheets that have a negligible flexural and torsional rigidity and bend under their own weight, has a high flexural and torsional rigidity as well as dimensional stability. The present invention permits a lightweight construction of the brake caliper while simultaneously achieving a high degree of rigidity. Tolerances resulting from the joining process are avoided and tolerance chains are reduced. The manufacturing cost is also reduced.

Advantageous embodiments and modifications of the invention are disclosed. According to one embodiment the disc brake has a self-amplifying device with a ramp mechanism. At least one ramp of the ramp mechanism is integrally joined to the housing and constitutes a reinforcing rib of the housing. The housing and the brake caliper are additionally reinforced by the ramp or ramps of the ramp mechanism required for the self-amplification. This embodiment of the invention also contributes to the reinforcement of the brake caliper due to the design of its housing.

According to one embodiment at least one ramp of the ramp mechanism constitutes a bearing support for a transmission shaft of a transmission of the actuating device of the disc brake. This unites two functions in a single component.

The core concept of the invention encompass a brake caliper that is rigid due to its design in that one or more ramps and/or a bearing support combine to constitute a reinforcing rib of the housing, which passes through the housing in the longitudinal direction, for example. This achieves a high flexural rigidity in the longitudinal direction of the housing, i.e. in the circumference direction or secant direction of the brake disc, and therefore in a direction that is usually subjected to high flexural stresses during actuation of the disc brake.

The reinforcing ribs of the housing may be joined to each other and/or to the housing walls in abutting fashion. These include, for example, T-joints or cross joints; the joints do not have to be at right angles. Viewed in cross section, the housing can thus be embodied in the form of a double-T support, and can therefore be embodied as very dimensionally stable and rigid.

Generally speaking, the purpose of the invention is to provide the housing and/or the brake caliper with a ribbing in order to achieve a high degree of dimensional stability and rigidity with simultaneously low wall thicknesses, low materials consumption, and low weight; in particular, elements that are required anyway, e.g. ramps of the ramp mechanism of the self-amplifying device, are used as reinforcing ribs.

According to one embodiment the housing is a molded part that is manufactured, for example, by means of casting, sintering, or forging. A simple and inexpensive manufacture of the housing and therefore of the brake caliper of the disc brake according to the invention is therefore possible with a simultaneously high degree of design freedom.

BRIEF DESCRIPTION OF THE DRAWINGS

The invention will be explained in greater detail below in conjunction with the drawings, in which.

DESCRIPTION OF THE PREFERRED EMBODIMENT

Figure 1:
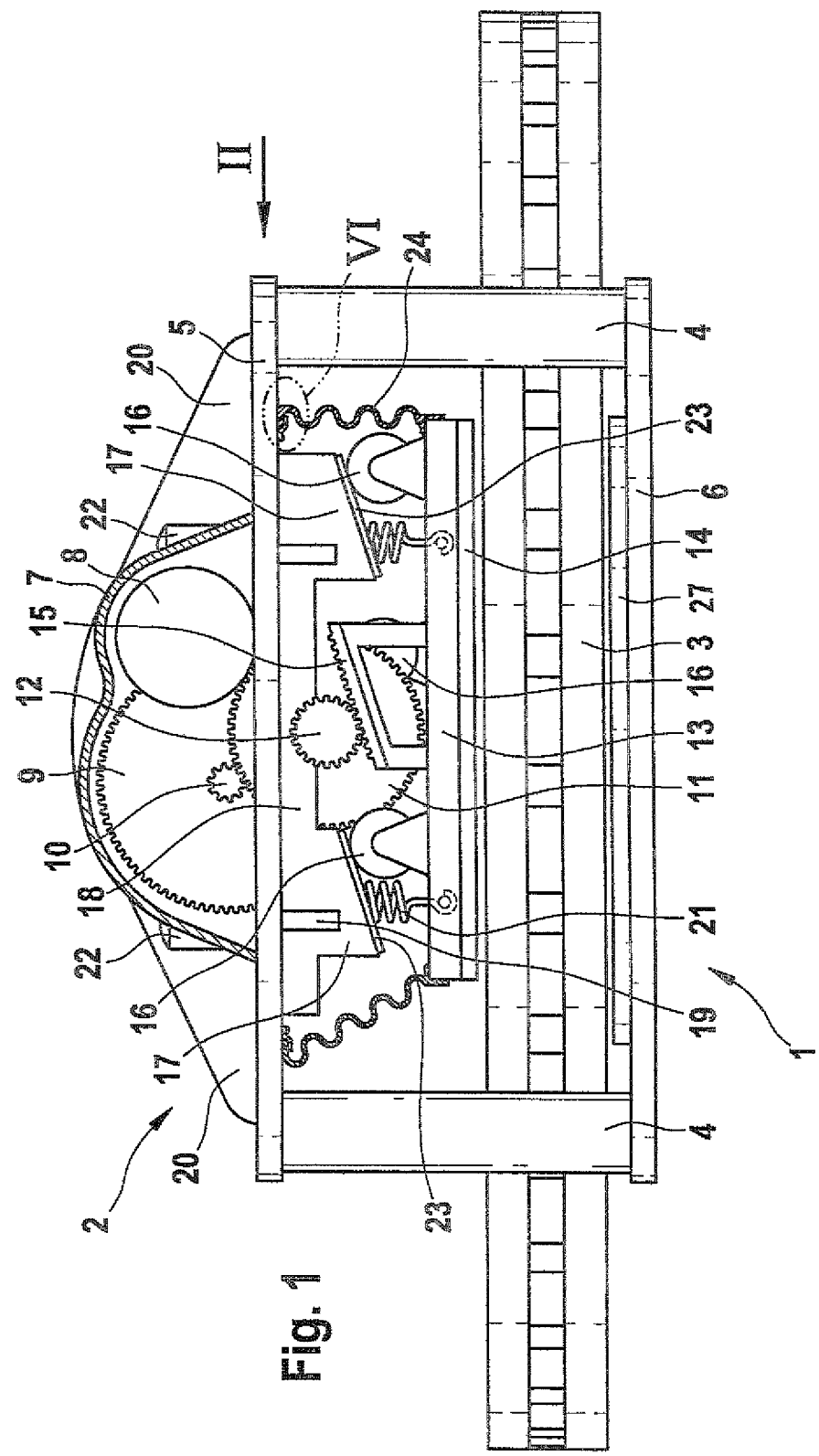
FIG. 1 shows a self-amplifying electromechanical disc brake according to the invention, viewed from the radial outside of a brake disc.

The self-amplifying electromechanical disc brake 1 according to the invention shown in FIG. 1 has a brake caliper 2, which is embodied in the form of a floating caliper, i.e. is guided so that it can move transversely in relation to a brake disc 3. In the drawing, a sliding guide of the brake caliper 2 is concealed by crosspieces 4 of the brake caliper 2 and is not visible. Such sliding guides are intrinsically known and therefore need not be explained in greater detail at this point.

The brake caliper 2 has two plates 5, 6 spaced apart from and parallel to each other, which are situated one on each side of the brake disc 3 and extend parallel to the brake disc 3. The two plates 5, 6 are integrally connected to each other at their longitudinal ends by crosspieces 4. The crosspieces 4 extend transversely in relation to the brake disc 3 and are situated outside a circumference of the brake disc 3. The crosspieces 4 are situated approximately along the longitudinal center of the plates 5, 6 (see FIG. 2), whereby they are essentially subjected only to tension when the disc brake 1 is actuated and at most, are subjected to a slight amount of bending and the plates 5, 6 remain parallel to each other and are not pushed diagonally apart from each other by an actuating force or application force of the disc brake 1. With the plates 5, 6 situated on each side of the brake disc 3 and attached to each other by means of the crosspieces 4, the brake caliper 2 constitutes a so-called frame caliper.

Figure 2:
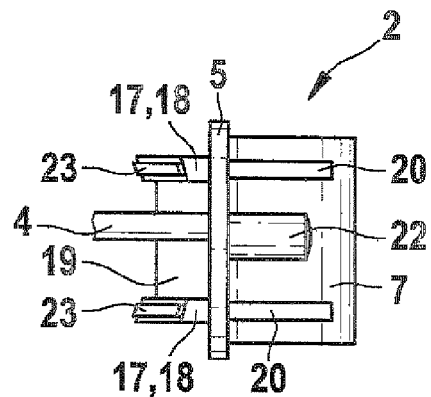
FIG. 2 shows a brake caliper of the disc brake, viewed in the direction of the arrow II in FIG. 1.

One of the two plates 5 of the brake caliper 2 has a housing 7 that forms a three-dimensional hollow body that protrudes out from the plane of the plate 5 and is dimensionally stable due to its design (also see FIG. 2). The housing 7 is integrally joined to the plate 5, i.e. the housing 7 is an integral component of the brake caliper 2. The brake caliper 2, together with the two plates 5, 6, the crosspieces 4 connecting the plates 5, 6, and the housing 7, is manufactured in a single piece as a molded part, for example by means of metal diecasting. The housing 7 reinforces the plate 5; in particular, the housing 7 makes the plate 5 flexurally and torsionally rigid, even if its wall thickness and plate thickness are slight.

The housing 7 accommodates an electric motor 8 capable of driving a large gear 9. A drive pinion of the electric motor 8 is situated at the end of the electric motor 8 oriented away from the viewer and is therefore not visible in the drawing. A shaft rotationally fixes the large gear 9 in relation to a pinion 10 that engages with a middle-sized gear 11, which is rotationally fixed in relation to a small gear 12 by means of a shaft. The electric motor 8, the pinion 10, and the large gear 9 are mostly situated on an outer side of the plate 5 of the brake caliper 2 oriented away from the brake disc 3; they are accommodated in the housing 7. The small gear 12 and the middle-sized gear 11 are mostly situated on an inner side of the plate 5 oriented toward the brake disc 3. The large gear 9 and the middle-sized gear 11 extend through the plate 5, passing through slots that are not visible in the drawing. The electric motor 8, the large gear 9, and the pinion 10 are electromechanical parts of the disc brake 1 that are accommodated in the housing 7, which can therefore be referred to as a motor and transmission housing.

FIG. 2 shows the brake caliper 2 in an end view according to the arrow II in FIG. 1. The brake caliper 2 is depicted in a broken view in the region of the crosspieces 4; the plate 6 is not shown. FIG. 2 shows only the brake caliper 2 without the installed parts, i.e. without the electromechanical parts 6 through 8. The drawing shows the plate 5 with the housing 7 and the ramps 17 that have not yet been explained.

On an inner side of the plate 5 of the brake caliper 2 oriented toward the brake disc 3, a pad support plate 13 is provided, with a friction brake pad 14 situated close to the brake disc 3 and spaced apart from the plate 5. The pad support plate 13 with the friction brake pad 14 can move in relation to the plate 5 and the brake caliper 2. On its rear side oriented away from the brake disc 3, the pad support plate 13 has a rack 15 that meshes with the small gear 12. The rack 15 is inclined at an angle in relation to the brake disc 3 and is also arc-shaped around a rotation axis of the brake disc 3, i.e. the rack 15 is curved in a helical fashion.

By means of three rolling elements 16 (rollers) that are situated on its back side and are supported in rotary fashion, the pad support plate 13 rests against ramps 17, which can also be referred to as wedges, situated on the inner side of the plate 5 of the brake caliper 2 oriented toward the brake disc 3. The ramps 17 are curved in helical fashion, with the same slope as the rack 15, i.e. extend an angle to the brake disc 3 around a rotation axis of the brake disc 3. The rolling elements 16 are situated at the corners of an imaginary triangle with a long base; two rolling elements 16 and two ramps 17 are situated radially further toward the outside in relation to the brake disc 3 than the third or middle rolling element 16 and the associated ramp 17 (see FIG. 2), which is situated between the two other rolling elements 16 and the two other ramps 17 in the circumference direction of the brake disc 3, i.e. in the longitudinal direction of the plate 5 of the brake caliper 2. This achieves a statically fixed three-point support of the pad support plate 13 in the brake caliper 2. As is clear in FIG. 2, the ramps 17 are transversely inclined; the outward transverse inclination of the middle ramp 17 situated further toward the radial inside is oriented opposite from the inward transverse inclination of the radially outer ramps 17. This achieves a longitudinal guidance of the pad support plate 13. In principle, it is also possible for the middle ramp 17 to conversely be situated further toward the radial outside in relation to the brake disc 3 than the two other ramps 17 and/or for the transverse inclinations of the ramps 17 to be reversed (not shown).

The actuation of the disc brake 1 occurs by means of the electric motor 8, which, by means of the gears 9, 11, 12 and pinion 10 that comprise a reduction gear train, moves the rack 15 and therefore the pad support plate 13 in the circumference direction or more precisely stated, along a helical path in relation to the brake disc 3. The rolling elements 16 of the pad support plate 13 roll along the ramps 17 of the brake caliper 2. The friction brake pad 14 is pressed against the brake disc 3 and moves the brake caliper 2, which is embodied in the form of a floating caliper, transversely in relation to the brake disc 3 so that a second friction brake pad 27 affixed to the other plate 6 of the brake caliper 2, on an inner side oriented toward the brake disc 3, is pressed against the other side of the brake disc 3. The brake disc 3 is braked. The rotating brake disc 3 exerts a friction force in the circumference direction on the friction brake pads 14, 27 being pressed against it, which acts on the pad support plate 13 in its sliding direction. Due to the inclination of the ramps 17 in relation to the brake disc 3 and in accordance with the so-called wedge principle, the support of the pad support plate 13 by means of the rolling elements 16 against the ramps 17 of the brake caliper 2 generates a normal force in relation to the ramps 17, which impinges on the rolling elements 16. This normal force in relation to the ramps 17 has a component, which is oriented transversely in relation to the brake disc 3 and presses the pad support plate 13, together with the friction brake pad 14, against the brake disc 3 in addition to the compressive force generated by the electric motor 8. This increases the braking force. The rolling elements 16 and the ramps 17 constitute a self-amplifying device of the disc brake 1. The gears 9, 11, 12 and pinion 10 constitute a reduction gear train, which, together with the electric motor 8 and the rack 15, constitute an electromechanical actuating device of the disc brake 1. The above-mentioned components constitute electromechanical parts 8 through 12 of the disc brake 1 and are partially accommodated in the housing 7 of the brake caliper 2.

The two outer ramps 17 are connected to each other by means of a reinforcing rib 18 of the brake caliper 2. The ramps 17, and therefore also the reinforcing rib 18, extend in the fog in of a cylinder around the rotation axis of the brake disc 3; a more central region of the reinforcing rib 18 constitutes a bearing support in which the shaft of the middle-sized gear 11 and small gear 12 is supported in rotary fashion. The reinforcing rib 18 is integrally joined to the plate 5 of the brake caliper 2; it protrudes from the plate 5 on the other side from the housing 7, i.e. the inner side oriented toward the brake disc 3 and, like the housing 7, is manufactured in one piece with the brake caliper 2 by means of a molding process, for example by means of metal diecasting. The reinforcing rib 18 extends in the circumferential direction of the brake disc 3 and in the longitudinal direction of the plate 5 of the brake caliper 2; it reinforces the plate 5 in particular against bending. The reinforcing rib 18 combines several functions; aside from its function of reinforcing the brake caliper 2, it also constitutes a bearing support for the shaft of the small gear 11 and middle-sized gear 12 and for the ramps 17 on which the pad support plate 13 rests. The inner or central ramp 17 likewise constitutes a reinforcing rib that is integrally joined to the brake caliper 2 and constitutes a bearing support in which the shaft of the middle-sized gear 12 and small gear 11 is supported in rotary fashion at a second point. This reinforcing rib 17 also combines several functions. For additional reinforcement, the brake caliper 2 has ribs 19 transverse to the reinforcing ribs 18 and longitudinal ribs 20 on an outside of the housing 7 and the outer side of the plate 5. Because of its ribbing and the fact that the housing 7 constitutes a hollow body, the brake caliper 2 has a high flexural and torsional rigidity. As is clear from FIG. 2, the reinforcing ribs 18 and longitudinal ribs 20 are situated abutting the plate 5 and the walls of the housing 7. As a result, the brake caliper 2 has a form similar to that of a double-T support, i.e. has a flexurally and torsionally rigid form.

Return springs 21 secure the pad support plate 13 to the brake caliper 2. In the exemplary embodiment, helical tension springs are used for the return springs 21, which are attached to the pad support plate 13 and to domes 22 of the brake caliper 2. The domes 22 are integrally joined to the brake caliper 2.

Figure 3:
FIG. 3 is a cross section through a ramp of the disc brake from FIG. 1.
Figure 4:
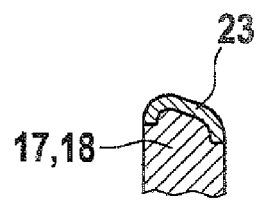
FIG. 4 is a modified embodiment of the ramp from FIG. 3.

The brake caliper 2 can be entirely or partially hardened in the region of the bearing surfaces of the ramps 17 and in the region of the rack 15. In the exemplary embodiment, another possibility has been selected; the ramps 17 are equipped with hardened strip-shaped bearing surfaces 23 that are manufactured as separate parts. The bearing surfaces 23 can be installed in a groove of the ramps 17 as show in FIG. 3 or can be placed onto the ramps 17 as shown in FIG. 4. Preferably, the bearing surfaces 23 can be embodied as convex in order to compensate for position tolerances, i.e. when rotation axes of the rolling elements 16 are not exactly parallel to the outer surfaces of the bearing surfaces 23 of the ramps 17. FIGS. 3 and 4 clearly show the transverse inclination of the bearing surfaces 23 of the ramps 17.

Figure 5:
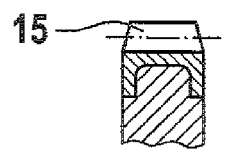
FIG. 5 is a cross section through a rack of the disc brake from FIG. 1.

Like the bearing surfaces 23, the rack 15 in the exemplary embodiment is also provided in the form of a separate hardened, wear-resistant component, which in this case, is attached to a rib (FIG. 5).

Figure 6:
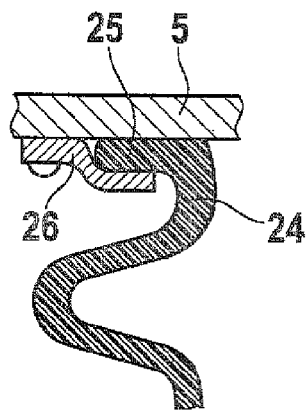
FIG. 6 is an enlarged depiction of the detail VI in FIG. 1.

On the inner side of the plate 5 of the brake caliper 2 oriented toward the brake disc 3, the mechanical parts of the disc brake 1 are enclosed by a rubber or plastic bellows 24. The bellows 24 is tubular, has an elliptical cross section, and extends from the plate 5 to the pad support plate 13 so that the mechanical and moving parts of the disc brake 1 are completely enclosed in the housing 7, the bellows 24, and the pad support plate 13 and are protected from moisture and contamination. FIG. 6 shows the attachment of the bellows 24 to the plate 5. The bellows 24 has a circumferential rim 25, which is shaped so that it bends inward and rests against the plate 5. An elliptical ring-shaped, cranked hold-down element 26 that is fastened to the plate 5 overlaps the rim 25 of the bellows 24 and holds it clamped against the plate 5. A different possibility for fastening the bellows 24 is provided on the pad support plate 13. In this case, the bellows 24 embraces the circumference of the pad support plate 13 and is also fastened by means of a belt similar to a pipe clamp, which is not visible in the drawing. In order for the bellows 24 to be even more secure, it can overlap a circumferential bead on the pad support plate 13 or can protrude into a circumferential groove on the pad support plate 13 and be additionally secured by a belt (not shown). This can significantly decrease the likelihood of the bellows 24 coming loose.

The foregoing relates to a preferred exemplary embodiment of the invention, it being understood that other variants and embodiments thereof are possible within the spirit and scope of the invention, the latter being defined by the appended claims.

The invention claimed is:

1. A self-amplifying electromechanical disc brake, having a brake caliper and a housing in which electromechanical parts of the disc brake are accommodated, wherein the brake caliper comprises two generally parallel first and second caliper plates connected together by cross pieces, each caliper plate having an inner surface facing toward the other caliper plate and an outer surface facing away from the other caliper plate, said first caliper plate having a self-amplifying device attached to its inner surface, said self-amplifying device being equipped with a ramp mechanism, wherein the housing is part of the brake caliper and comprises a dimensionally stable, hollow body that reinforces the brake caliper against bending and/or torsion, said housing being integrally joined to the outer surface of the first caliper plate, wherein the brake caliper further comprises a pad support plate positioned between said caliper plates, said pad support plate having a friction pad attached thereto, wherein said pad support plate is attached to said first caliper plate by a tubular bellows located between said pad support plate and said first caliper plate, and said tubular bellows surrounds said self-amplifying device, wherein a reinforcing rib for reinforcing the brake caliper is integrally joined to and projects toward said pad support plate from the inner surface of the first caliper plate, and wherein the first caliper plate, the housing and the reinforcing rib are embodied as a single piece.

2. The self-amplifying electromechanical disc brake as recited in claim 1, wherein at least one ramp of the ramp mechanism constitutes a bearing support for a transmission shaft of a transmission of the disc brake.

3. The self-amplifying electromechanical disc brake as recited in claim 1, wherein the housing includes at least one additional reinforcing rib joined to the housing abutting said first caliper plate.

4. The self-amplifying electromechanical disc brake as recited in claim 3, wherein the at least one additional reinforcing rib joined to the housing is also joined to the outer surface of said first caliper plate.

5. The self-amplifying electromechanical disc brake as recited in claim 1, wherein the housing is a molded part.

6. The self-amplifying electromechanical disc brake as recited in claim 1, wherein said ramp mechanism includes at least one ramp which has a bearing surface that is embodied as a separate part.

7. The self-amplifying electromechanical disc brake as recited in claim 1, wherein the disc brake comprises a rack as a component of a transmission, and the rack is embodied as a separate part and is fastened in the housing.

8. The self-amplifying electromechanical disc brake as recited in claim 1, wherein said bellows is fastened to the first caliper plate by a hold-down element.

9. The self-amplifying electromechanical disc brake as recited in claim 1, wherein rolling elements and/or bearing surfaces of the ramp mechanism have a convex bearing surface.

10. The self-amplifying electromechanical disc brake as recited in claim 1, wherein said ramp mechanism comprises two ramps extending toward the second caliper plate, the two ramps being connected to each other by the reinforcing rib.

11. The self-amplifying electromechanical disc brake as recited in claim 10, wherein the caliper further comprises an additional rib which is transverse to said reinforcing rib and is connected to the inner surface of said first caliper plate.

12. The self-amplifying electromechanical disc brake as recited in claim 10, wherein the caliper further comprises a plurality of additional ribs which are transverse to said reinforcing rib and are connected to the inner surface of said first caliper plate.

13. The self-amplifying electromechanical disc brake as recited in claim 1, wherein said tubular bellows is attached between said pad support plate and said first caliper plate to maintain a tubular configuration at all positions of said pad support plate.

14. The self-amplifying electromechanical disc brake as recited in claim 1, wherein said ramp mechanism includes three ramps attached to said first caliper plate in a triangular configuration.

15. The self-amplifying electromechanical disc brake as recited in claim 1, further comprising at least one return spring mounted between said pad support plate and said first caliper plate.

* * * * *